United States Patent [19]

Takao

[11] Patent Number: 5,208,717
[45] Date of Patent: May 4, 1993

[54] PORTABLE INFORMATION REPRODUCING AND VOICE AMPLIFYING APPARATUS

[75] Inventor: Hideo Takao, Nagano, Japan

[73] Assignee: Seiko Epson Corporation, Tokyo, Japan

[21] Appl. No.: 900,523

[22] Filed: Jun. 17, 1992

Related U.S. Application Data

[63] Continuation of Ser. No. 827,544, Jan. 29, 1992, abandoned, which is a continuation of Ser. No. 445,655, Nov. 29, 1989, abandoned.

[30] Foreign Application Priority Data

| Mar. 31, 1988 | [JP] | Japan | 63-044135 |
| Mar. 31, 1988 | [JP] | Japan | 63-044136 |
| Jun. 10, 1988 | [JP] | Japan | 63-077497 |

[51] Int. Cl.$^5$ .............. G11B 33/12; H04B 1/20; H04B 1/00; H04R 27/00
[52] U.S. Cl. .............. 360/137; 360/1; 369/4; 381/82; 381/119
[58] Field of Search .............. 360/1, 137; 369/4; 381/122, 119, 75, 76, 110, 111, 120, 61, 77, 82; D14/160-165, 185-187, 226, 260

[56] References Cited

U.S. PATENT DOCUMENTS

| D. 306,589 | 3/1990 | Murayama | D14/165 |
| D. 310,079 | 8/1990 | Mitsuse | D14/165 |
| D. 318,666 | 7/1991 | Mitsuse | D14/161 |
| 3,693,984 | 9/1972 | Probst et al. | 360/96.3 |
| 4,064,374 | 12/1977 | Sato | 360/137 |
| 4,095,261 | 6/1978 | Rodriguez | 360/13 |
| 4,151,470 | 4/1979 | Sato | 369/5 |
| 4,237,540 | 12/1980 | Sato | 360/1 |
| 4,293,742 | 10/1981 | Sato et al. | 360/137 |
| 4,360,174 | 11/1982 | Tomita et al. | 242/200 |
| 4,654,728 | 3/1987 | Lunsford | 360/74.1 |
| 4,819,101 | 4/1989 | Lemelson | 360/35.1 |

FOREIGN PATENT DOCUMENTS

| 55-9131 | 1/1980 | Japan. | |
| 57-31600 | 7/1982 | Japan. | |
| 0090487 | 5/1984 | Japan | 381/122 |
| 0204398 | 11/1984 | Japan | 381/119 |
| 0119200 | 6/1985 | Japan | 381/75 |
| 62-129898 | 8/1987 | Japan. | |

OTHER PUBLICATIONS

Introducing the Calfax Sport Horn, Washington Post, Dec. 13, 1981.

Primary Examiner—John H. Wolff
Assistant Examiner—Craig A. Renner
Attorney, Agent, or Firm—Blum Kaplan

[57] ABSTRACT

A portable music information reproducing and voice amplifying apparatus for reproducing music recorded on a recording medium and voice sound inputted through a voice input unit in unison through a speaker. The apparatus is integrally formed by incorporating a sound recording medium storage portion with the voice input unit and the speaker spaced apart, by a grip portion, to avoid feedback from the speaker to the microphone.

2 Claims, 9 Drawing Sheets

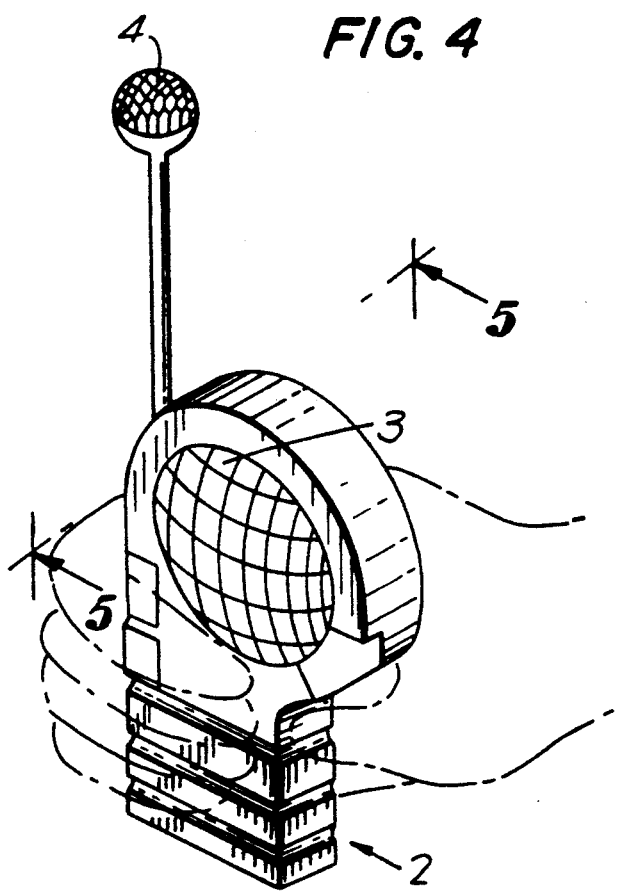
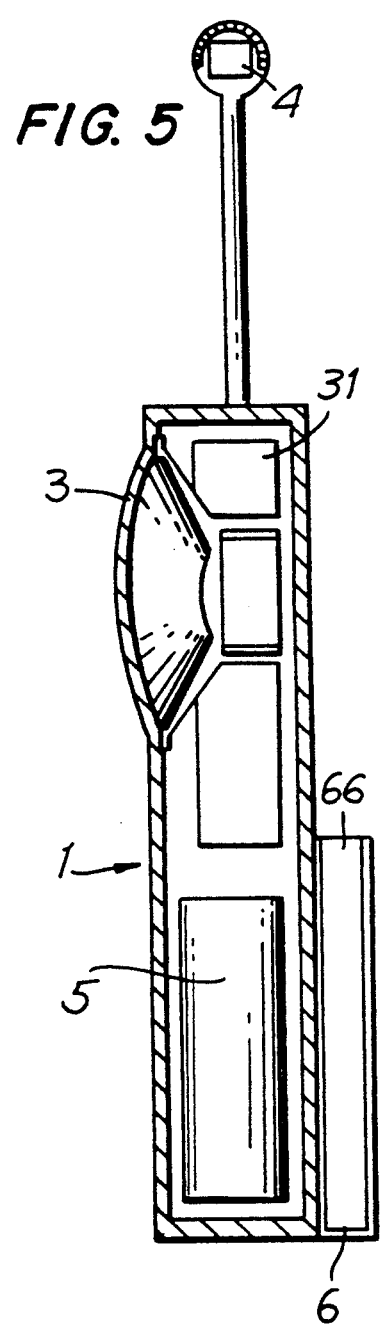
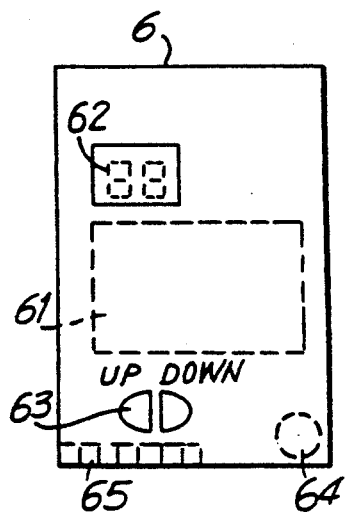
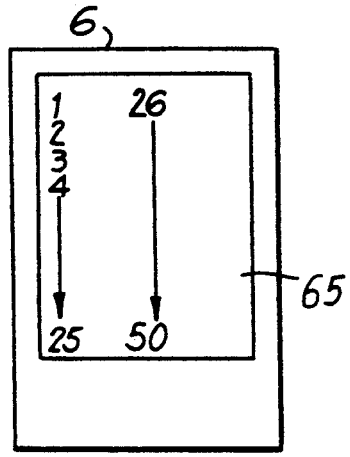

PORTABLE INFORMATION REPRODUCING AND VOICE AMPLIFYING APPARATUS

This is a continuation of application Ser. No. 07/827,544, filed Jan. 29, 1992 which is a continuation of application Ser. No. 07/445,655, filed Nov. 29, 1989, now both abandoned.

TECHNICAL FIELD

The present invention relates to a portable recording and reproducing apparatus having a microphone, a speaker, and an accommodating portion for accommodating a sound recording medium such as a magnetic tape.

BACKGROUND ART

The apparatus in accordance with the present invention is used mainly for the purpose of so-called karaoke, i.e., singing to a cassette-recorded orchestra tune.

Conventionally, a so-called karaoke apparatus is adapted to reproduce a melody recorded on a magnetic medium such as a magnetic tape and to allow a person to input voice through a microphone formed as a separate member, thereby allowing the person to sing a song to the melody through the speaker.

However, such a conventional apparatus is very large in size and weighs more than several kilograms and is so heavy that an adult can barely carry it. Since it is used as a floor mounting type, the conventional karaoke apparatus has been very inconvenient and difficult to carry.

In addition, similar apparatuses include a radio cassette tape recorder incorporating a radio and a cassette tape recorder, and a portable cassette tape recorder which mainly has a reproducing function and the size of which is made small enough to allow the apparatus to be put in a pocket of a jacket or the like [e.g., "Walkman" (a trademark of Sony Corporation)]. However, the radio cassette tape recorder is both large in size and heavy in order to perform karaoke with the apparatus held in one hand, and is poor in terms of operational features and portability. On the other hand, the compact cassette tape recorder does not include a speaker which is capable of amplifying sounds in a relatively wide range for so-called karaoke or the like, and cannot therefore be used for the the purpose of karaoke.

Accordingly, an object of the present invention is to provide a portable recording and reproducing apparatus which is capable of transmitting (amplifying) sounds in a relatively large range constructed in an apparatus which is not found in the above-described prior art.

DISCLOSURE OF INVENTION

To attain the above-described object, in accordance with the present invention, there is provided a portable recording and reproducing apparatus including accommodating means for accommodating a sound recording medium, detection means for detecting the recording of the sound recording medium, and a microphone for detecting an external sound, characterized in that a speaker for amplifying and reproducing the sound detected by the detection means and/or the microphone is formed integrally.

In the above-described apparatus, the microphone and the speaker are spaced apart from each other such a distance that no howling or feedback occurs.

Furthermore, in the above-described apparatus, the sound recording medium is constituted by a magnetic recording medium, the detection means is constituted by magnetic recording detection means, and the speaker has a magnet, the speaker is disposed spaced apart from the detection means a distance that does not impair the detection characteristics of the detection means.

In addition, in the above-described apparatus, the detection means for detecting the recording of the sound recording medium and the microphone are disposed in the sound recording medium accommodating portion, and a grip portion is provided spaced apart from the accommodating portion.

Thus, since the speaker for amplifying and reproducing the sound detected by the detection means for detecting the recording of the sound recording medium and/or the microphone is formed integrally, it is possible to arrange a compact and portable recording and reproducing apparatus. Additionally, the speaker has a capacity sufficient to make the reproduced sound audible within a range of several meters therefrom so that the apparatus can be used for so-called karaoke.

Since the microphone and the speaker, are disposed spaced apart from each other at a distance such that no howling or feedback occurs, the reproduced sound and input speech (voice) to the microphone can be reproduced favourably.

In accordance with another aspect of the invention, as the sound recording medium is constituted by a magnetic recording medium, and the detection means is arranged by magnetic recording detection means, it is possible to use a magnetic tape or the like. When the sound is reproduced and amplified by the speaker provided with a magnet, as the speaker is disposed spaced apart from the detection means at a distance that does not impair the detection characteristics of the detection means, the output of the magnetic recording detection means (magnetic head or the like) is not impaired due to the magnet of the speaker.

In addition, if the grip portion is interposed between the speaker and the accommodating portion where the detection means is disposed, the apparatus excels in portability and makes it possible to control howling or feedback.

BRIEF DESCRIPTION OF DRAWINGS

FIGS. 4 to 7 are diagrams schematically illustrating still another embodiment of the apparatus of the invention, in which FIG. 4 is a diagram of an external appearance, FIG. 5 is a cross-sectional view, and FIGS. 6 and 7 are diagrams illustrating a melody card used in the apparatus of the invention;

FIGS. 9 and 10 are diagrams schematically illustrating a still further embodiment of the apparatus of the invention, in which FIG. 9 is an external view, while FIG. 10 is a partial schematic diagram;

FIGS. 12 and 13 are diagrams schematically illustrating a further embodiment of the apparatus of the invention, in which FIG. 12 is an external view, while FIG. 13 is a cross-sectional view;

BEST MODE FOR CARRYING OUT THE INVENTION

Figure 1:
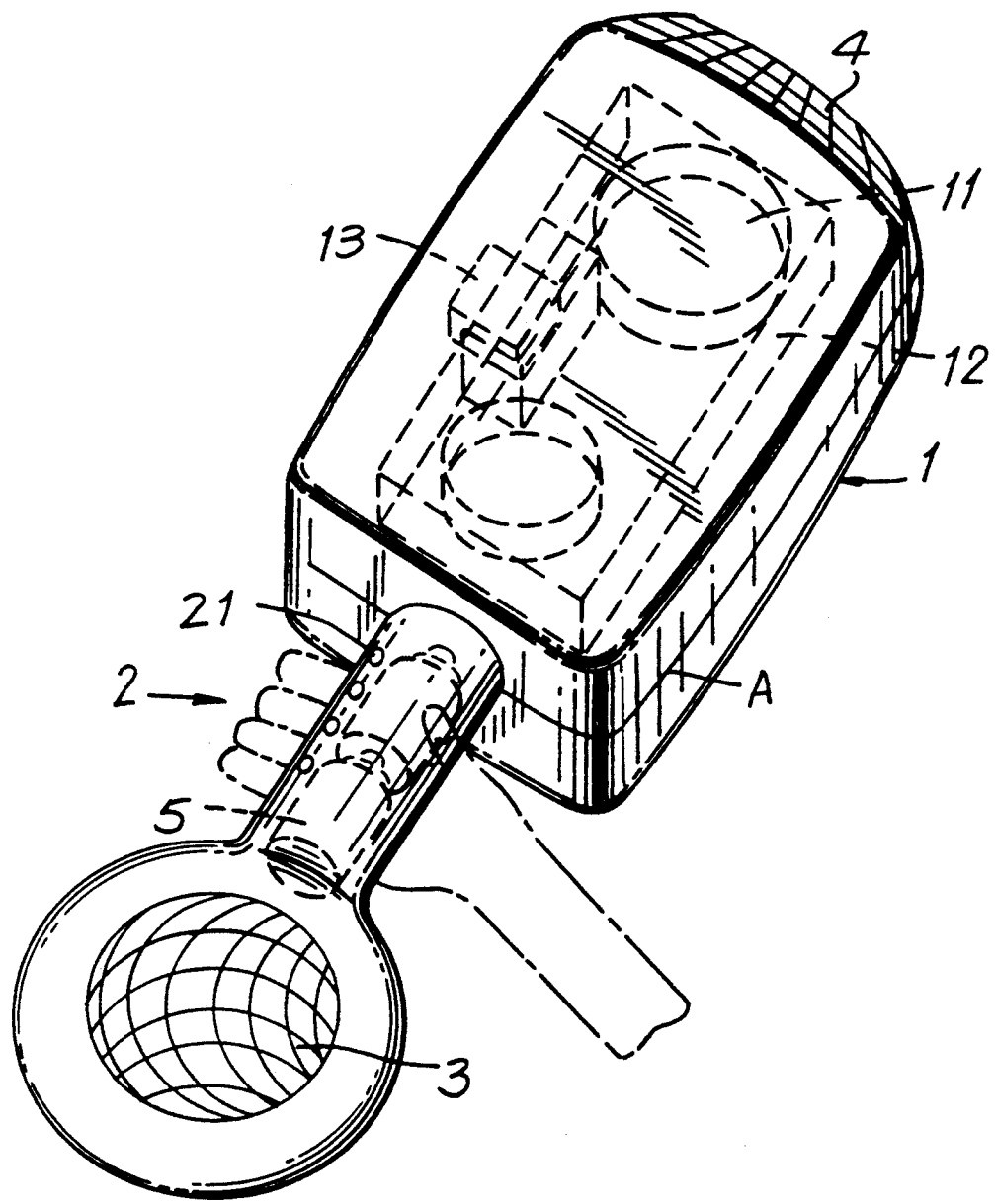
FIG. 1 is a schematic diagram of a portable recording and reproducing apparatus in accordance with the present invention.

FIG. 1 is a schematic diagram of a portable recording and reproducing apparatus in accordance with the present invention.

EMBODIMENT 1

The apparatus in accordance with the present invention has a grip portion 2 interposed between a speaker 3 and a magnetic recording medium accommodating portion 1 for accommodating a magnetic recording medium such as a magnetic tape 11. The magnetic tape 11 is placed in a cassette case 12 and can be detachably accommodated in the magnetic recording medium accommodating portion 1 together with the cassette case 12. Music (melody), voice or the like is recorded on the magnetic tape 11, and the recorded information is detected by a magnetic head 13 and its sound is reproduced and amplified by the speaker 3. A microphone (voice detecting means) 4 is provided in proximity to the magnetic recording medium accommodating portion 1. The voice input unit 4 can be used for the purpose of so-called karaoke, allowing voice to be input in tune with music when the musical information recorded on the magnetic tape 11 is amplified by the speaker 3 via the magnetic head 13, the voice is also amplified together with music by the speaker 3. Incidentally, it is necessary for the speaker 3 to be provided with a size sufficient to allow the apparatus to be used for a small party or the like so that the sound can be heard in a wide range to a certain extent.

In addition, a fixed size is also required for the magnetic recording medium accommodating portion 1 since the size of the magnetic tape 11 or the cassette case 12 accommodating the magnetic tape 11 is fixed.

The grip portion 2 is interposed between the magnetic recording medium accommodating portion 1 and the speaker 3. Batteries 5 serving as a power source for the overall apparatus may be accommodated in this portion. In addition, in order to improve the operating efficiency, switches 21 may be provided for, among others, the turning on and off of the power source and fast forward, stop, and (fast) rewind of the tape, and the switching over of sounds from the magnetic tape 11 and/or the voice input unit 4 with respect to the sounds that are amplified through the speaker 3.

The magnetic tape 11 comprises a known tape in which information such as music is written by means of the magnetic force by providing a coating of magnetic particles thereon.

In addition, the magnetic head 13 is adapted to detect the magnetic information written on the magnetic tape, and comprises one which is generally used for a (cassette) tape-recorder, a radio cassette tape-recorder, or the like. There are cases where a magnetic head is weak against a powerful magnetic force, making the detection of magnetism inaccurate. In the apparatus of the present invention, since the speaker 3 and the magnetic recording medium accommodating portion 1 having the magnetic head 13 are spaced apart from each other via the grip portion 2, there are no cases where the performance of the magnetic head 13 becomes inaccurate or deteriorated by the magnetic force generated by a powerful magnet provided in the speaker 3. Similar to a speaker used for a tape-recorder or the like, speaker 3 is provided with a powerful magnet and a diaphragm for vibrating the air.

In the same way as the voice input portion used for a radio cassette tape-recorder, a microphone, or the like, the voice input portion is arranged such that the diaphragm vibrates when voice or the like is input, and that vibration is converted into an electric signal, thereby allowing voice or the like to be input.

If the microphone 4 and the speaker 3 are provided in proximity with each other, a so-called howling or feedback occurs. However, since the speaker 3 and the voice input portion 4 provided on the magnetic recording medium accommodating portion 1 are spaced apart from each other via the grip portion 2, the so-called howling or feedback can be prevented.

The magnetic recording medium accommodating portion 1 and the speaker 3 require certain design restrictions based on the size of the cassette and in order to maintain the amplification performance above a fixed level. However, since no such restrictions are imposed on the grip portion 2, it is possible to make its sectional area to be smaller than those of the magnetic recording medium accommodating portion 1 and/or the speaker 3. In this arrangement, there are no cases where the accommodating portion 1 or the speaker 3 is gripped inadvertently, with the result that a handling error is unlikely to occur. The batteries 5 used as the power source for the apparatus, such as dry cells, may be accommodated in the grip portion 2. If the batteries 5 are accommodated therein, even if the grip portion 2 is gripped firmly, the compression is restricted by the batteries, making it possible to prevent the apparatus from breaking.

A magnet is accommodated in the speaker 3, but there are no cases where the position of the voice input unit 4 is mistaken if an arrangement is provided such that one end of the apparatus is made heavy by using a powerful magnet to secure the amplification performance of the speaker, and the magnetic recording medium accommodating portion 1 at the other end thereof is made light so that when the apparatus is carried by one hand for the purpose of karaoke, the speaker 3 is heavy and is naturally positioned downwardly, while the magnetic recording medium accommodating portion 1 is positioned upwardly.

In addition, if the overall apparatus is formed in an elongated configuration in such a manner that the magnetic recording medium accommodating portion 1, the grip portion 2, and the speaker 3 are arranged linearly, it is possible to prevent a deterioration of the performance of the magnetic head due to the magnetic force of the magnet provided in the speaker as well as a howling or feedback occurring due to the voice input unit 4 being disposed in proximity to the speaker 3. If an arrangement is provided such that the apparatus is difficult to stand when an attempt is made to set the magnetic recording medium accommodating portion 1 (or the speaker 3) upwardly with the speaker 3 (or the accommodating portion 1) set as the bottom, the apparatus can always be kept laid down when it is not being carried. This arrangement makes it possible to prevent the breakage of or damage to the apparatus which can occur when the apparatus falls if it is stood against something. In order to make the apparatus difficult to set upright, it suffices if the contacting area of the bottom is made small with the speaker 3 or the magnetic recording medium accommodating portion 1 as the bottom. For instance, the bottom may be formed with a slightly pointed configuration or a round configuration.

Although in the above-described embodiment, a description has been given by citing a magnetic tape as the magnetic medium, a medium such as a magnetic record may also be used. In this case as well, a magnetic head is also naturally required.

The overall apparatus may be formed of a plastic or a metallic plate case. In such a case, if an arrangement is provided such that the overall apparatus can be split into two sections, it is possible to enhance the strength of the apparatus whose overall strength is small due to the provision of the elongated portion of the grip portion 2. In that case, the two split line may be provided in such a manner that the respective portions of the magnetic recording medium accommodating portion 1, the grip portion 2, and the speaker 3 are split into two and, at the same time, the overall apparatus is split into two. Specifically, the overall apparatus is arranged to be split along a dividing line A shown in FIG. 1. If this arrangement is adopted, molding can be facilitated, and assembly can also be facilitated.

It should be noted that a circuit unit for effecting the reproduction and amplification of a magnetic recording can be provided on the rear side of the speaker 3 or in the accommodating portion 1, or it may be provided in the grip portion 2.

Thus, the apparatus shown in FIG. 1 comprises the grip portion 2, the sound recording medium accommodating portion (magnetic recording medium accommodating portion) 1 provided upwardly of the grip portion 2, the voice input unit 4 provided upwardly of the accommodating portion 1, and the speaker 3 provided downwardly of the grip portion 2.

EMBODIMENT 2

Figure 2:
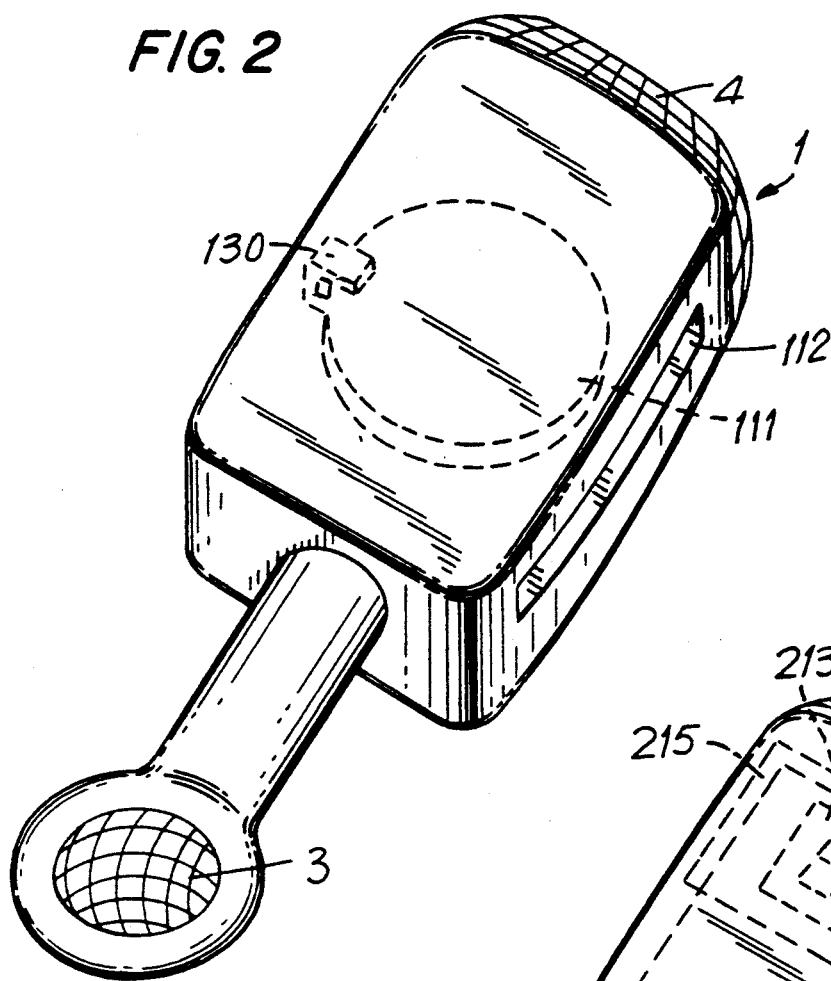
FIGS. 2 and 3 are diagrams schematically illustrating another embodiment of the apparatus of the invention.

As shown in FIG. 2, instead of a magnetic tape, a CD record 111 is used as the sound recording medium. The detection of a recorded sound is effected by a detection head 130 which is adapted to detect irregular surfaces by being brought into contact with the record surface through application of a laser beam thereto and detection thereof. It should be noted that the insertion and withdrawal of the CD record 111 are effected through an insertion port 112 provided in a side portion of the accommodating portion 1.

EMBODIMENT 3

Figure 3:
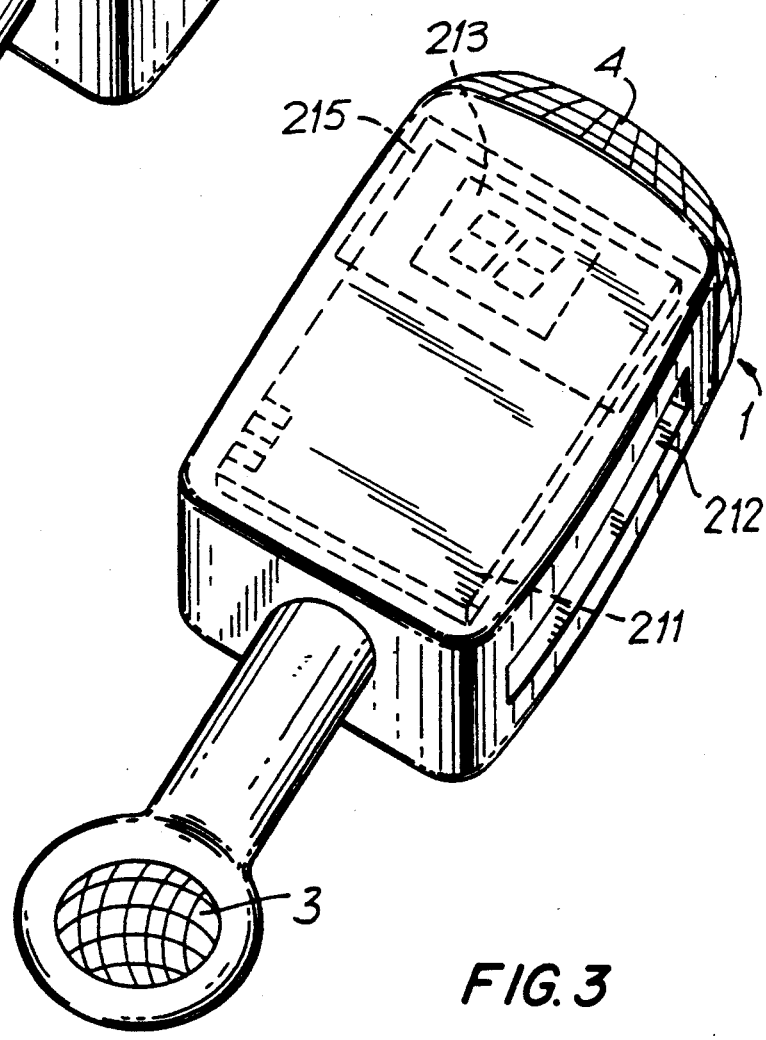

As shown in FIG. 3, a card-type sound recording medium 211 constituted by an IC card incorporating a memory IC is used as the sound recording medium. An insertion port 212 for effecting insertion and withdrawal is provided for the IC card 212 in a side portion of the accommodating portion 1. A terminal 214 is provided in a side portion of the IC card, and is coupled with a corresponding terminal coupling portion of the apparatus at the time of insertion of the IC card, allowing the contents of the memory to be read. The IC card 211 is provided with a liquid crystal panel display 213, and the number of a tune is displayed thereon. The display 213 can be viewed through a transparent window 215 provided in the accommodating portion 1.

EMBODIMENT 4

FIGS. 4, 5, 6 and 7 show a portable recording and reproducing apparatus using a melody card, in which FIG. 4 is a diagram illustrating an outer appearance of the apparatus, FIG. 5 is a side cross-sectional view, and FIGS. 6 and 7 are diagrams illustrating an obverse surface and a reverse surface of the melody card, respectively. As shown in FIG. 4, the apparatus is provided with the microphone 4 which is spaced apart from the speaker 3 a fixed distance. The grip portion 2 is provided with an uneven surface such as one having grooves, thereby allowing the user to hold the grip portion 2 easily. The grip portion 2 also serves as the accommodating portion 1 for the batteries 5. An amplification circuit and the like are provided in a space on the rear side of the speaker 3. A melody card 6 is inserted into a melody card insertion case 66 provided on the rear surface of the accommodating portion 1. The melody card 6 is inserted in such a manner that its obverse surface shown in FIG. 6 faces the right-hand side of FIG. 5. An IC 61 in which melodies are stored is mounted on the melody card 6, and a number is displayed on a number display 62 constituted by a liquid crystal panel as a number selection switch 63 is pressed in accordance with a number printed portion 65 which is printed on the reverse surface of the melody card 6. A power source constituted by a button-type battery or the like is also incorporated in the melody card 6. The melody card 6 is inserted from the speaker 3 side, and a terminal 65 is provided at a terminal portion thereof and is coupled with a terminal provided on the apparatus body.

In this embodiment, the melody card insertion case 66 may be provided in the accommodating portion 1 of the apparatus for accommodating the batteries 5.

In addition, a magnetic card may be used instead of the IC card.

As described above, the apparatus comprises the grip portion 2 also serving as the sound recording medium accommodating portion 1, the speaker 3 provided upwardly of the grip portion 2, and the microphone 4 serving as the voice input unit provided in an extended portion above the speaker 3.

EMBODIMENT 5

Figure 8:
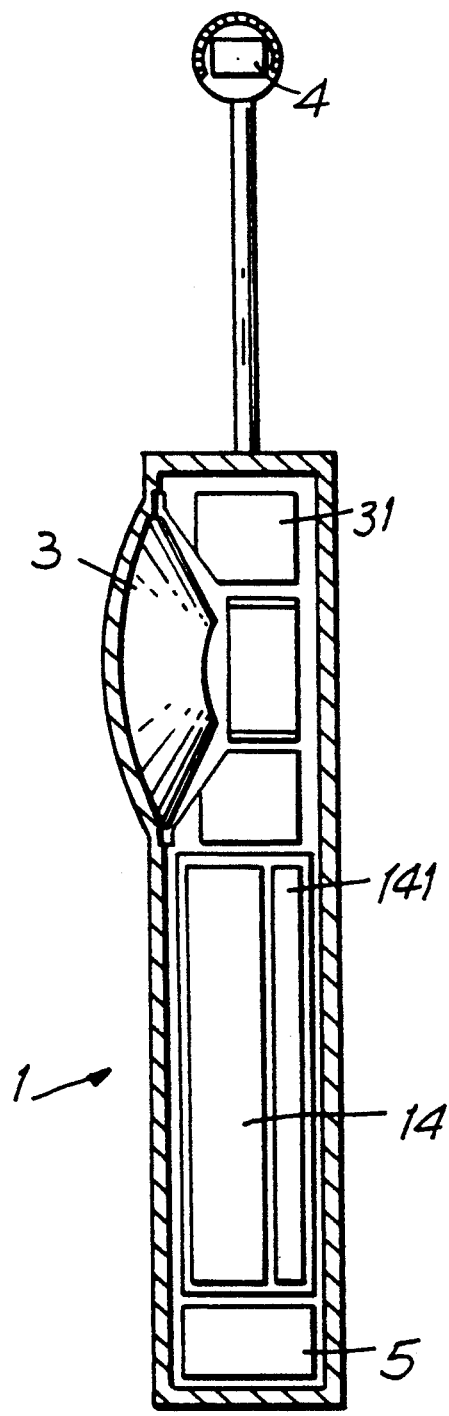
FIG. 8 is a diagram schematically illustrating a further embodiment of the apparatus of the invention.

FIG. 8 illustrates a structure of the apparatus in which a cassette-type magnetic tape or a CD record is used instead of the melody card used in the recording and reproducing apparatus shown in FIGS. 4 to 7. Although the overall arrangement is similar to the one shown in FIGS. 4 to 7, an accommodating portion 14 for accommodating a magnetic tape (or a CD record) and a driving portion 141 for driving the magnetic tape (or the CD record) are provided in the lateral direction of the apparatus having a small thickness, as illustrated in FIG. 8.

EMBODIMENT 6

Figure 9:
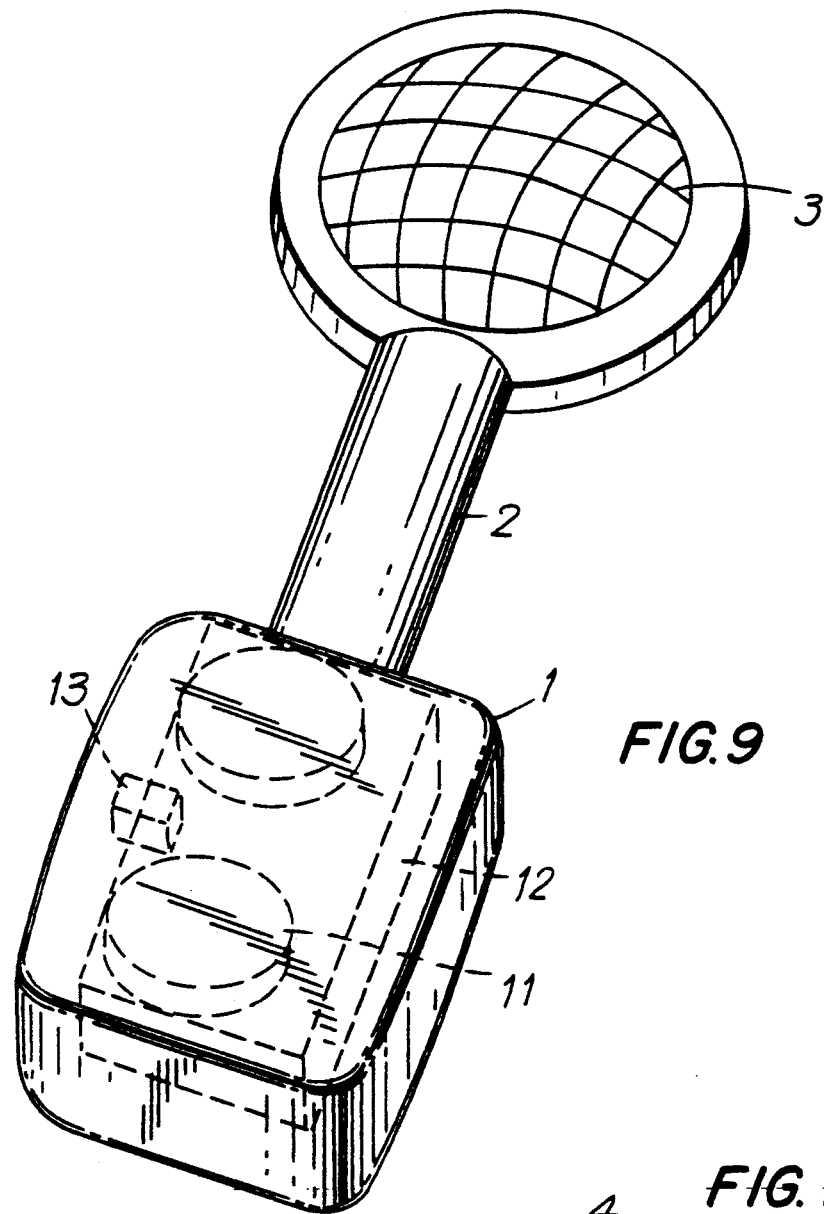
Figure 10:
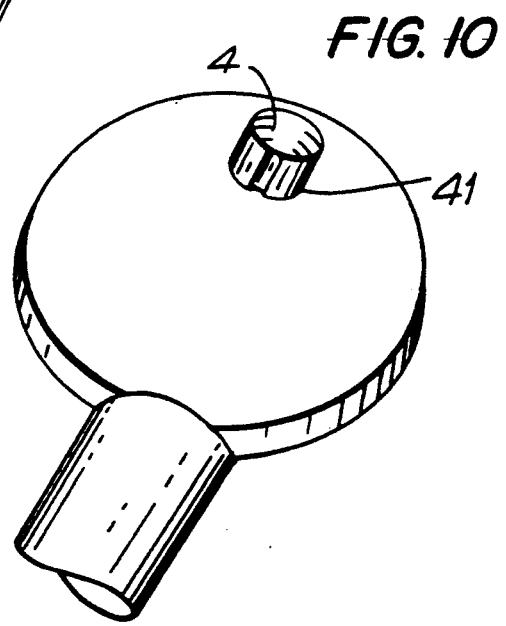

FIGS. 9 and 10 illustrate an example in which the microphone 4 is provided on the rear side (shown in FIG. 10) of the speaker 3. The microphone 4 and the speaker 3 are disposed in proximity to each other. Therefore, since the microphone 4 is provided remote from the side of the speaker 3, howling or feedback does not occur. The distal end portion of the microphone 4 is spherical in shape, and the microphone 4 is accommodated in a cavity 41 provided in the apparatus body.

The microphone 4 extends in such a manner that the proximal end portion thereof is remote from the speaker 3.

EMBODIMENT 7

Figure 11:
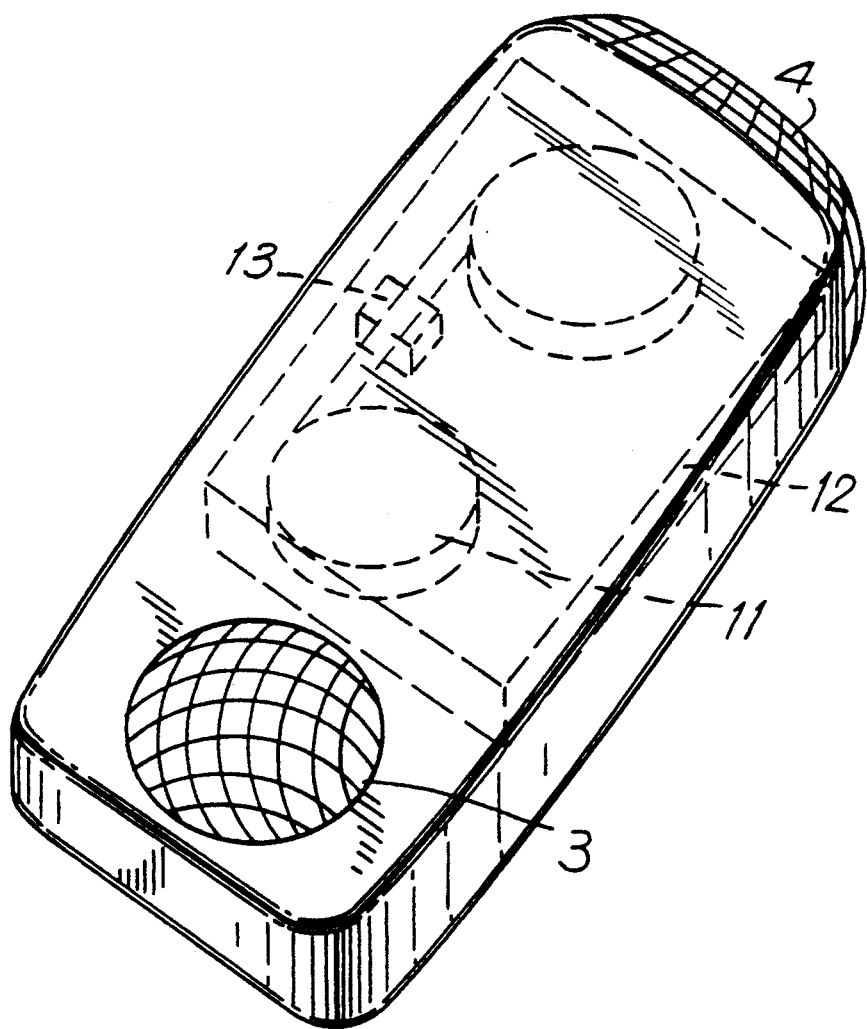
FIG. 11 is a diagram schematically illustrating a further embodiment of the apparatus of the invention.

FIG. 11 illustrates an embodiment in which the microphone 4, the speaker 3, and the magnetic tape 11 constituting the sound recording medium are incorporated in a box-shaped case having a substantially rectangular parallelepiped configuration. This arrangement helps to improve the stability of the apparatus.

EMBODIMENT 8

Figure 12:
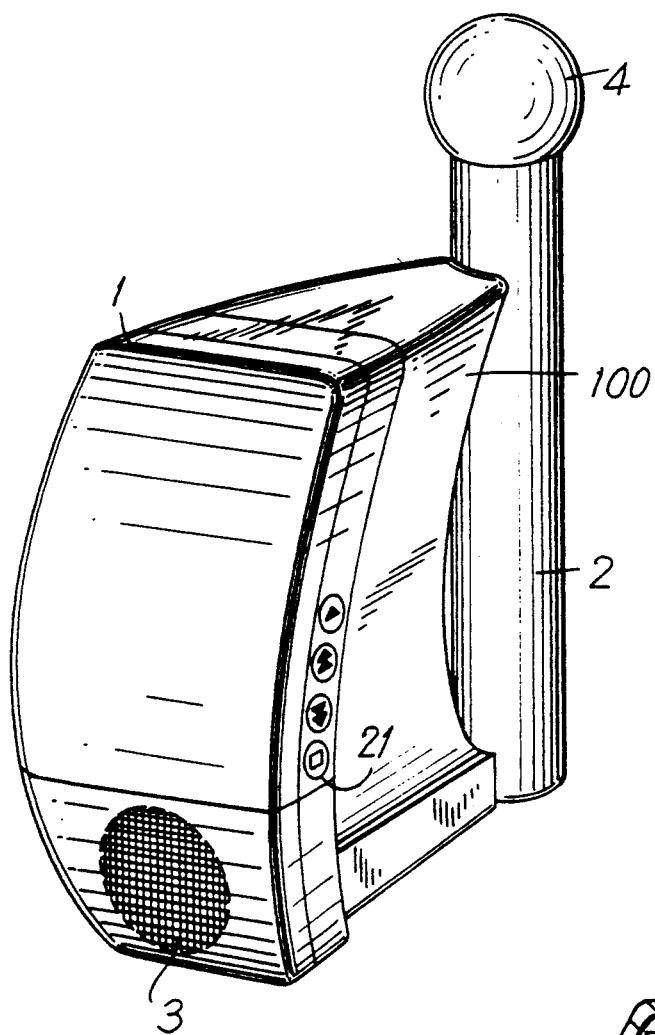
Figure 13:
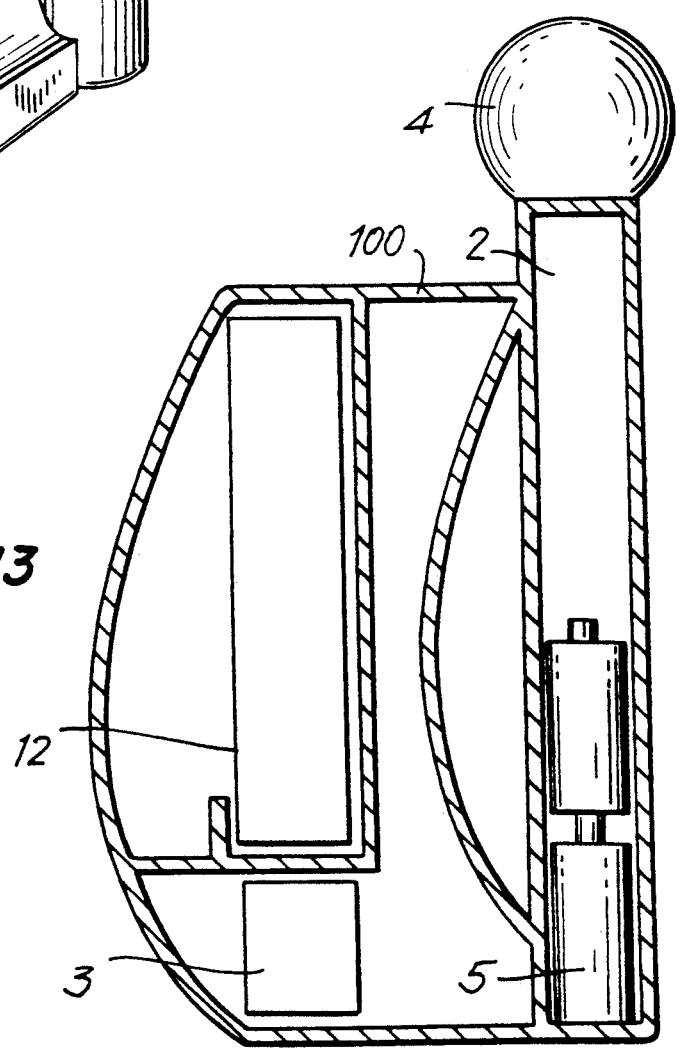
Figure 14:
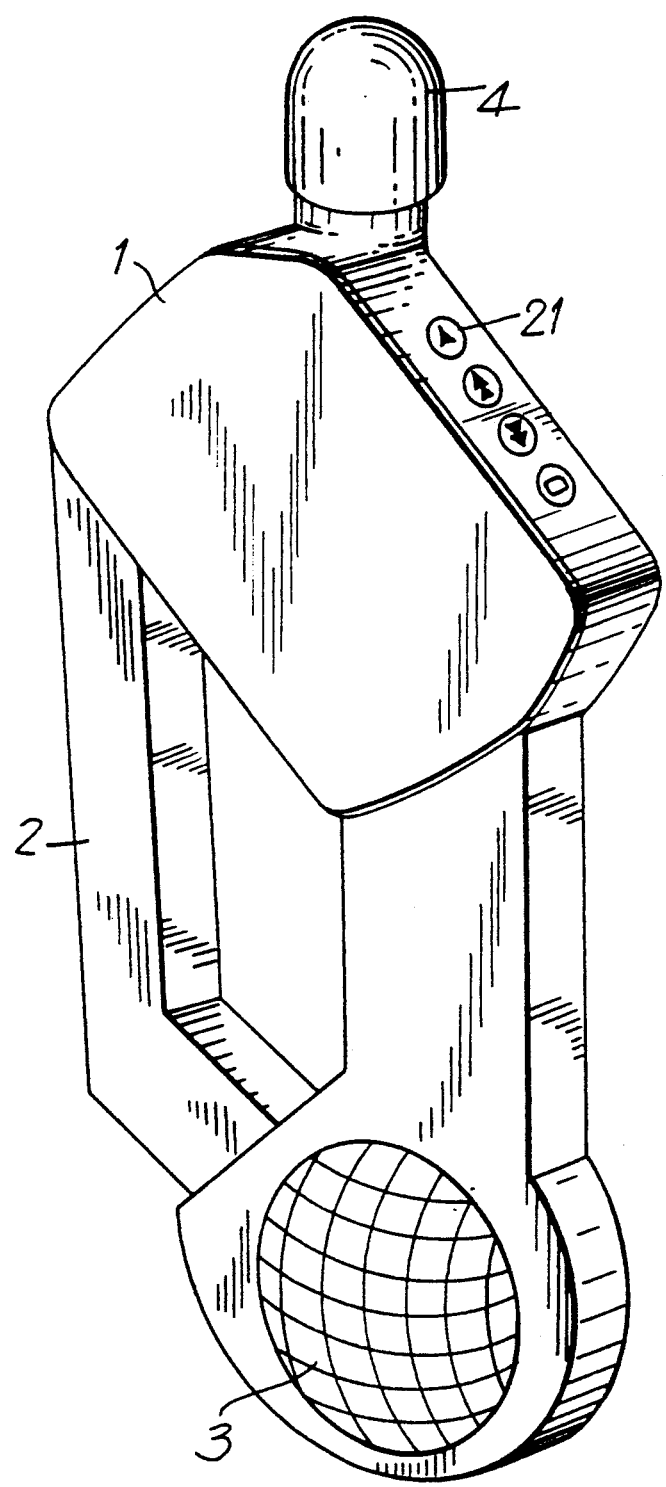
FIG. 14 is a diagram schematically illustrating a further embodiment of the apparatus of the invention.

The apparatus shown in FIGS. 12 and 13 is arranged such that the microphone 4 and the speaker 3 are spaced apart from each other. A space 100 is provided between the grip portion 2 and the accommodating portion 1 for accommodating a cassette-type sound recording medium such as a magnetic recording medium. By providing the accommodating portion 1 with a curved surface the amplified sound from the speaker 3 reverberates producing a desired acoustic effect. The batteries 5 are accommodated in the grip portion 2. Incidentally, FIGS. 12 and 13 illustrate an outer appearance and an internal structure, respectively.

As is apparent from the drawings, the apparatus comprises a bar-shaped grip portion 2 provided with the microphone 4, i.e., the voice input unit, at an upper end thereof. The sound recording medium accommodating portion 1 provided in such a manner as to project forwardly of the grip portion 2. As described before, the speaker 3 is provided in front of the sound recording medium accommodating portion 1, so that the sound from the speaker 3 can be transmitted well in the forward direction. If the speaker 3 is disposed on the lower portion of the accommodating portion 1, the microphone 4 and the speaker 3 can be spaced apart from each other, thereby making it possible to minimize the effect of howling or feedback.

This apparatus can be operated by being held with one hand in the same manner as a beer mug is held.

If the bottom of this apparatus is made flat, the apparatus can be placed upright on a desk, a floor, a mat, or the like when not in use.

Conversely, if the bottom is made spherical or is made to project so that the apparatus cannot be placed upright, and is always laid down when not in use, it is possible to prevent any damage caused to the microphone 4 and the like due to the falling of the apparatus.

EMBODIMENT 9

FIG. 13 illustrates a further embodiment of the apparatus in accordance with the present invention. The microphone 4 and the speaker 3 are respectively disposed at the opposite ends of the apparatus. A sound recording medium such as a magnetic tape is accommodated in the accommodating portion 1 provided obliquely. The grip portion 2 is held by, for instance, the left hand, and the switches 21 are operated by a right-hand finger so as to effect the replay, rewind, fast forward, etc. of the tape.

As illustrated in the drawing, the apparatus of this embodiment comprises the grip portion 2, the recording medium accommodating portion 1 disposed forwardly and upwardly of the grip portion 2, the microphone 4, i.e., the voice input unit, disposed on an upper portion of the accommodating portion 1, and the speaker 3 disposed forwardly and downwardly of the grip portion 2.

EMBODIMENT 10

Figure 15:
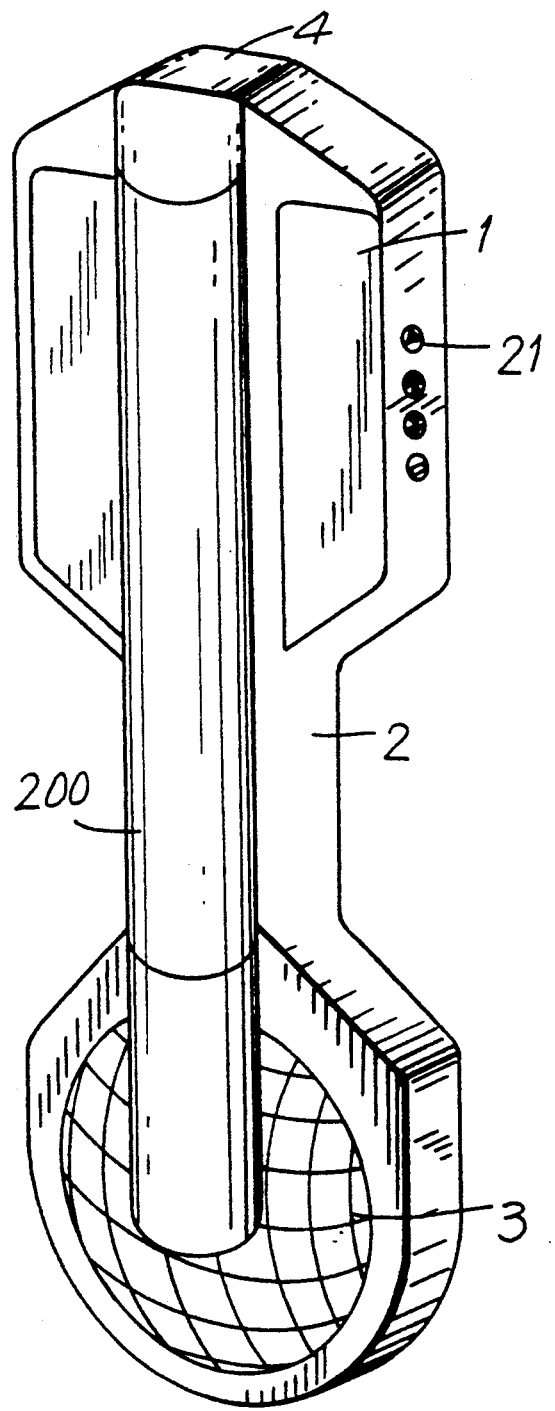
FIG. 15 is a diagram schematically illustrating a further embodiment of the apparatus of the invention.

FIG. 15 illustrates a still further embodiment of the apparatus in accordance with the present invention. Although the apparatus shown in the drawing is similar to the one shown in FIG. 1 in that the microphone 4 and the speaker 3 are provided on the opposite ends of the apparatus, a protruding shaft portion 200 is provided extending from the accommodating portion 1 to the speaker 3. This shaft portion 200 serves to reinforce the grip portion 2 so that the apparatus will not be bent or broken at the grip portion 2.

INDUSTRIAL APPLICABILITY

As described above, since a grip portion for carrying is provided between the magnetic recording medium accommodating portion and the speaker, the apparatus excels in portability, and it becomes to possible to prevent so-called howling or feedback and a deterioration in the performance of the magnetic head.

As the sectional area of the grip portion is made smaller than those of the speaker and the magnetic recording medium accommodating portion, it is possible to secure a sufficient accommodating area for the magnetic medium, thereby making it possible to secure various characteristics such as the reproduction and amplification of sounds above the level of fixed qualities.

As the speaker is made heavier than the magnetic medium accommodating portion, when the apparatus is carried, the user is prevented from mistaking the position of the voice input unit disposed in proximity to the accommodating portion.

As the apparatus is so arranged that it is difficult to stand with the speaker or the magnetic recording medium accommodating portion set as the bottom, when the apparatus is temporarily placed on a desk, a floor, or the like, it is possible to prevent the apparatus from being placed in an unstable state, thereby preventing any damage to the apparatus.

As the grip portion is disposed between the microphone and the speaker, the apparatus excels in portability, and the howling or feedback can be controlled.

What is claimed is:

1. A portable music information reproducing and voice amplifying apparatus suitable for use as a karaoke device which can be held as a unit in one hand of a user with a microphone thereof facing the user's head, comprising:

a housing having a first side, a second side essentially opposite said first side, a first end between said first and second sides facing in a first direction, a second end opposed to said first end facing in a second direction, and a first portion and a second portion spaced in the directions faced by said first and second ends respectively, said housing formed with accommodating means within the housing for accommodating a music information recording medium having information recorded thereon;

an elongated handle having a first end and a second end, at least one of the first and second ends of the handle being attached to the housing so as to define a space between the handle and the housing dimensioned to receive at least a portion of the hand of the user, the handle being adapted to enable the apparatus to be held as a unit solely by the handle, the first end of the handle having a segment extending beyond the first end of the housing in the direction faced by said first end of the housing, said handle being formed with a battery storing portion for storing batteries for powering said apparatus;

detection means positioned in the accommodating means for detecting the information on the recording medium;

circuit means coupled to said detection means for effecting reproduction of the information on the recording medium to form a part of an output signal representative of the information;

said microphone for detecting an external voice sound, the microphone being electrically coupled to the circuit means to form a part of said output signal representative to the voice sound, said microphone being rigidly mounted on the segment of the first end of the handle extending beyond the first end of the housing; and speaker means for receiving the output signal of the circuit means to generate a combined audible sound including the information from the recording medium and the voice sound, said speaker means being positioned in the housing on the second side thereof to project away from the handle and to be spaced from the microphone so that no feedback occurs;

said housing supporting said handle, said detection means, said circuit means, said microphone and said speaker means to form a unitary structure supportable solely by said handle;

whereby when the apparatus is used for karaoke and is held as a unit by the user one handedly by only the handle, the microphone can face essentially upwardly toward the head of the user and the speaker means projects the audible sound away from the body of the user.

2. A portable music information reproducing and voice amplifying apparatus suitable for use as a karaoke device which can be held as a unit in one hand of a user with a microphone thereof facing the user's head, comprising:

a housing having a first side, a second side essentially opposite said first side, a first end between said first and second sides facing in a first direction, a second end opposed to said first end facing in a second direction, and a first portion and a second portion spaced in the directions faced by said first and second ends respectively, said housing formed with accommodating means within the housing for accommodating a music information recording medium having information recorded thereon;

an elongated handle having a first end and a second end, the first end of the handle being attached to the first portion of the housing and the second end of the handle being attached to the second portion of the housing so as to define a space between the handle and the housing dimensioned to receive at least a portion of the hand of the user, the handle being adapted to enable the apparatus to be held as a unit solely by the handle, the first end of the handle having a segment extending beyond the first end of the housing in the direction faced by said first end of the housing, said handle being formed with a battery storing portion for storing batteries for powering said apparatus;

detection means positioned in the accommodating means for detecting the information on the recording medium;

circuit means coupled to said detection means for effecting reproduction of the information on the recording medium to form a part of an output signal representative of the information;

said microphone for detecting an external voice sound, the microphone being electrically coupled to the circuit means to form a part of said output signal representative of the voice sound, said microphone being rigidly mounted on the segment of the first end of the handle extending beyond the first end of the housing; and speaker means for receiving the output signal of the circuit means to generate a combined audible sound including the information from the recording medium and the voice sound, said speaker means being positioned in the housing on the second side thereof to project away from the handle and to be spaced from the microphone so that no feedback occurs;

said housing supporting said handle, said detection means, said circuit means, said microphone and said speaker means to form a unitary structure supportable solely by said handle;

whereby when the apparatus is used for karaoke and is held as a unit by the user one handedly by only the handle, the microphone can face essentially upwardly toward the head of the user and the speaker means projects the audible sound away from the body of the user.

* * * * *